(12) United States Patent
Nagakura et al.

(10) Patent No.: US 12,685,903 B2
(45) Date of Patent: Jul. 21, 2026

(54) GOLF BALL

(71) Applicant: Sumitomo Rubber Industries, Ltd., Kobe (JP)

(72) Inventors: Hikaru Nagakura, Kobe (JP); Takumi Kaneko, Kobe (JP); Takehiko Hyodo, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 149 days.

(21) Appl. No.: 18/439,293

(22) Filed: Feb. 12, 2024

(65) Prior Publication Data

US 2024/0278081 A1 Aug. 22, 2024

(30) Foreign Application Priority Data

Feb. 16, 2023 (JP) ................................. 2023-022444

(51) Int. Cl.
 *A63B 37/06* (2006.01)
 *A63B 37/00* (2006.01)
 *C08L 9/00* (2006.01)

(52) U.S. Cl.
 CPC .... *A63B 37/0063* (2013.01); *A63B 37/00621* (2020.08); *A63B 37/0073* (2013.01); *A63B 37/008* (2013.01); *A63B 37/0087* (2013.01); *C08L 9/00* (2013.01); *A63B 37/0074* (2013.01); *A63B 37/0075* (2013.01); *C08L 2205/025* (2013.01); *C08L 2205/03* (2013.01)

(58) Field of Classification Search
 CPC ........................... A63B 37/005; A63B 37/0073
 See application file for complete search history.

(56) References Cited

U.S. PATENT DOCUMENTS

| | | | |
|---|---|---|---|
| 6,884,181 B1 * | 4/2005 | Cadorniga | ......... A63B 37/0003 |
| | | | 473/371 |
| 2017/0028261 A1 * | 2/2017 | Sakamine | ........ A63B 37/00621 |
| 2020/0376347 A1 * | 12/2020 | Hayashi | .................... C08L 9/00 |
| 2021/0299522 A1 * | 9/2021 | Nagakura | ................ C08K 5/09 |

FOREIGN PATENT DOCUMENTS

| | | |
|---|---|---|
| JP | 60-92780 A | 5/1985 |
| JP | 61-71069 A | 4/1986 |

* cited by examiner

*Primary Examiner* — Raeann Gorden

(74) *Attorney, Agent, or Firm* — Birch, Stewart, Kolasch & Birch, LLP

(57) ABSTRACT

An object of the present disclosure is to provide a golf ball having excellent durability and an increased spin rate on driver shots to travel a suppressed flight distance. The present disclosure provides a golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is less than 16 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness.

20 Claims, 2 Drawing Sheets

GOLF BALL

FIELD OF THE DISCLOSURE

The present disclosure relates to a golf ball, specifically relates to a novel golf ball aiming at realization of a sustainable and better society.

DESCRIPTION OF THE RELATED ART

With the aim of realization of a sustainable and better society, materials constituting a golf ball have recently been studied. The use of a natural rubber for a rubber constituting a golf ball is being focused on.

Golf is a sport played in a vast land. From the viewpoint of efficient use of the land, a space-limited practice range, an indoor practice range, and an indoor golf such as a virtual golf are also increasing. A golf ball travelling a restricted flight distance in these practice ranges is being desired.

For example, JP S60-92780 A discloses a practice range golf ball obtained by vulcanizing a composition containing 3 to 35 parts by weight of a rubber with low resilience, 20 to 30 parts by weight of methacrylic acid, and 20 to 50 parts by weight of a metal compound which can form a metal salt with methacrylic acid, with respect to 100 parts by weight of a base rubber.

In addition, JP S61-71069 A discloses a range golf ball obtained from a composition containing 3 to 35 parts by weight of an epoxidized natural rubber with an epoxidation degree of 10 to 60 mole %, 20 to 35 parts by weight of methacrylic acid, and 20 to 50 parts by weight of zinc oxide, with respect to 100 parts by weight of a base rubber.

SUMMARY OF THE DISCLOSURE

As described above, a golf ball travelling a restricted flight distance is being desired, but if the resilience of the golf ball is lowered to restrict the flight distance as done by the prior art, the durability tends to be lowered.

The present disclosure has been made in view of the above described circumstances, and an object of the present disclosure is to provide a golf ball having excellent durability and an increased spin rate on driver shots to travel a restricted flight distance in a golf ball using a natural rubber.

The present disclosure provides a golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is less than 16 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness.

According to the present disclosure, a novel golf ball aiming at realization of a sustainable and better society and having excellent durability and a high spin rate on driver shots to travel a restricted flight distance, is obtained.

DESCRIPTION OF THE PREFERRED EMBODIMENT

Figure 1:
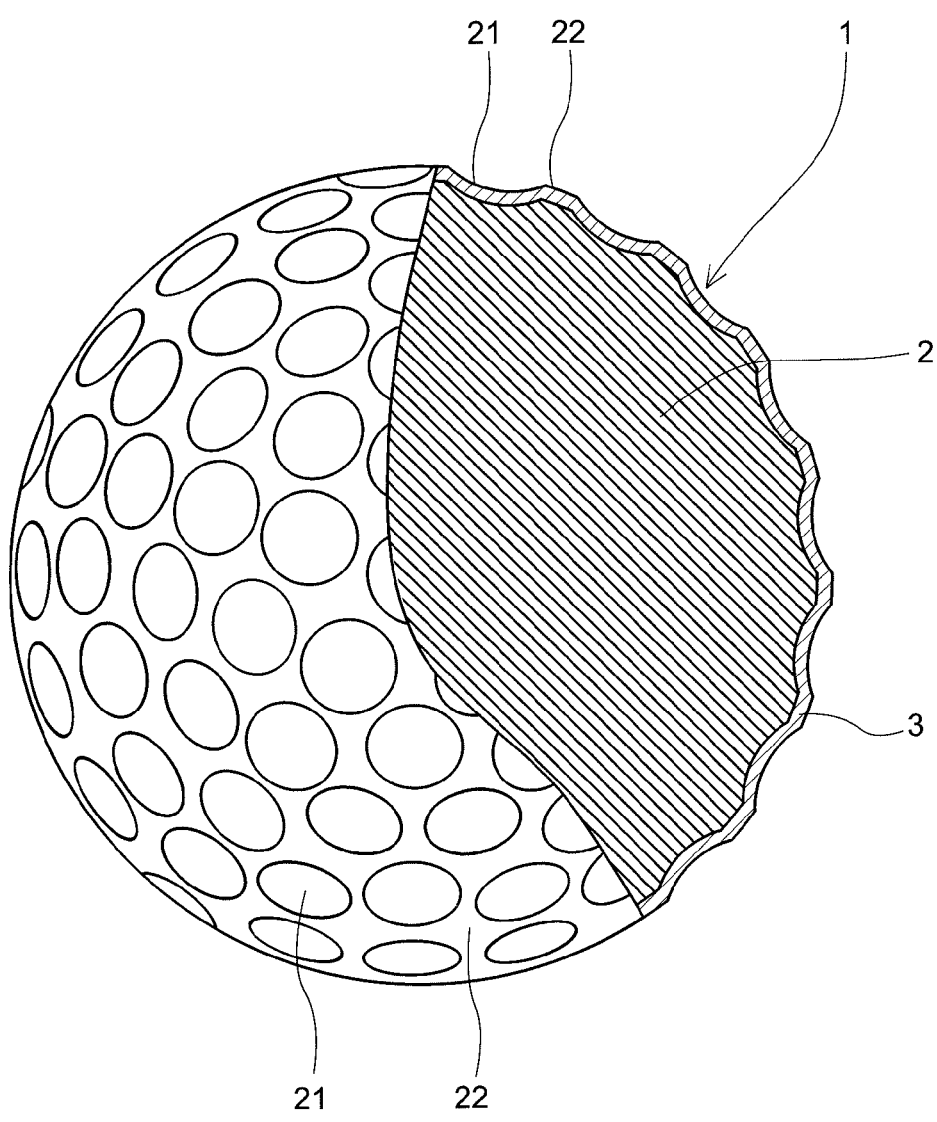
FIG. 1 is a partially cutaway cross-sectional view showing a one-piece golf ball according to one embodiment of the present disclosure.

The present disclosure provides a golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is less than 16 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness.

The golf ball according to the present disclosure has an increased spin rate on driver shots while having improved durability by having the above described construction. The golf ball having a high spin rate on driver shots travels a restricted flight distance on driver shots.

First, the hardness of the spherical constituent member of the golf ball according to the present disclosure will be explained.

The center hardness (Ho) of the spherical constituent member of the golf ball according to the present disclosure is 65 or more, preferably 66 or more, more preferably 68 or more in Shore C hardness. If the center hardness (Ho) is 65 or more in Shore C hardness, the high spin rate on driver shots is easily achieved, and the golf ball also has good resilience. In addition, the center hardness (Ho) is not particularly limited, and is preferably 80 or less, more preferably 78 or less, and even more preferably 75 or less in Shore C hardness. If the center hardness (Ho) is 80 or less in Shore C hardness, the golf ball has better shot feeling.

The hardness difference (Hs–Ho) between the surface hardness (Hs) and the center hardness (Ho) of the spherical constituent member is less than 16, preferably 15 or less, more preferably 12 or less, and even more preferably 10 or less in Shore C hardness. If the hardness difference (Hs–Ho) is less than 16 in Shore C hardness, the spherical constituent member has a small degree of an outer-hard and inner-soft structure, and thus the high spin rate on driver shots is easily achieved and the durability also improves. In addition, the hardness difference (Hs–Ho) is not particularly limited, and is preferably 3 or more, more preferably 4 or more, and even more preferably 5 or more in Shore C hardness. If the hardness difference (Hs–Ho) is 3 or more in Shore C hardness, sufficient durability is kept.

The absolute value of the hardness difference (Hs–H50) between the surface hardness (Hs) of the spherical constituent member and the hardness (H50) at the 50% point of the radius of the spherical constituent member from the center of the spherical constituent member is 10 or less, preferably 8 or less, more preferably 5 or less, and even more preferably 3 or less in Shore C hardness. It is noted that the lower limit of the absolute value of the hardness difference (Hs–H50) is 0 in Shore C hardness. If the absolute value of the hardness difference (Hs–H50) is 10 or less in Shore C hardness, the outer region of the spherical constituent member has a flat hardness distribution, and thus the high spin rate on driver shots is easily achieved and the golf ball also has good durability and shot feeling. It is noted that the hardness difference (Hs–H50) may be a positive number or a negative number.

The surface hardness (Hs) of the spherical constituent member is not particularly limited, and is preferably 70 or more, more preferably 72 or more, and even more preferably 75 or more, and is preferably 90 or less, more preferably 85 or less, and even more preferably 80 or less in Shore C hardness. If the surface hardness (Hs) falls within the above range, the golf ball has better durability and shot feeling.

The hardness (H50) at the 50% point of the radius of the spherical constituent member from the center of the spherical constituent member is not particularly limited, and is preferably 65 or more, more preferably 70 or more, and even more preferably 73 or more, and is preferably 85 or less, more preferably 82 or less, and even more preferably 80 or less in Shore C hardness. If the hardness (H50) falls within the above range, the golf ball has better durability and shot feeling.

The hardness difference (H50-Ho) between the hardness (H50) at the 50% point of the radius of the spherical constituent member from the center of the spherical constituent member and the center hardness (Ho) of the spherical constituent member is not particularly limited, and is preferably 0 or more, more preferably 3 or more, and even more preferably 5 or more, and is preferably 10 or less, more preferably 9 or less, and even more preferably 8 or less in Shore C hardness. If the hardness difference (H50–Ho) falls within the above range, the golf ball has better durability and shot feeling.

It is noted that the center hardness (Ho) of the spherical constituent member, and the hardness (H50) at the 50% point of the radius of the spherical constituent member from the center of the spherical constituent member are hardnesses obtained by cutting the spherical constituent member along a cross-section passing through the center of the spherical constituent member to obtain a cut plane, and measuring the hardnesses at the center of the cut plane and at the point located at the predetermined distance from the center. The surface hardness (Hs) of the spherical constituent member is a hardness measured on the surface of the spherical constituent member.

The spherical constituent member of the golf ball according to the present disclosure is preferably formed from a rubber composition containing (a) a rubber component containing a natural rubber, (b) a co-crosslinking agent, (c) a crosslinking initiator, and (d) an organic sulfur compound.

(a) The rubber component preferably contains a natural rubber (NR). The natural rubber is prepared by slicing plants that produce natural rubber latex, collecting the latex, and coagulating the rubber component contained in the latex, and includes naturally derived cis-1,4-polyisoprene.

Examples of the plant that produce the natural rubber latex include *Para* rubber tree and *Ceara* rubber tree which belong to the Euphorbiaceae family; *Indian* rubber tree, *Panama* rubber tree and *Lagos* rubber tree which belong to the Moraceae family; *Arabia* rubber tree and *Tragacanth* rubber tree which belong to the Fabaceae family; Jelutong tree, Zanzibar rubber tree, *Funtumia elastica* and *Urceola* which belong to the Apocynaceae family; Guayule rubber tree and Rubber dandelion which belong to the Composite family; Gutta-percha tree, Balata rubber tree and *Sapodilla* which belong to the Sapotaceae family; *Ipomoea nil* which belongs to the Asclepiadaceae family; and *Eucommia* which belongs to the Eucommiaceae family.

Examples of the natural rubber include a CV grade in which the rubber viscosity is stabilized by adding a viscosity stabilizer or the like to a raw latex, and a non-CV grade in which the rubber viscosity is not stabilized. The natural rubber may be used solely, or two of them may be used in combination. Among them, the CV grade having the stabilized viscosity is particularly preferable. It is noted that the natural rubber may be either SMR (Standard Malaysia Rubber) or SVR (Standard Vietnam Rubber).

The Mooney viscosity ($ML_{1+4}$ (100° C.)) of the natural rubber is preferably 30 or more, more preferably 35 or more, and even more preferably 40 or more, and is preferably 80 or less, more preferably 75 or less, and even more preferably 70 or less. If the Mooney viscosity of the natural rubber falls within the above range, the processability when performing molding is better.

The amount of the natural rubber in (a) the rubber component is preferably 10 mass % or more, more preferably 20 mass % or more, and even more preferably 30 mass % or more, and is preferably 50 mass % or less, more preferably 48 mass % or less, and even more preferably 45 mass % or less. If the amount of the natural rubber in (a) the rubber component falls within the above range, a high spin rate on driver shots is more easily achieved.

(a) The rubber component preferably further contains a synthetic rubber in addition to the natural rubber. The synthetic rubber is an artificially synthesized material having rubber elasticity. The synthetic rubber includes, for example, a chemically synthesized rubber produced by polymerizing one or at least two monomers, and a natural rubber derivative produced through a chemical reaction of a natural rubber. Examples of the synthetic rubber include a diene based rubber such as a polybutadiene rubber (BR), a polyisoprene rubber (IR), a styrene-polybutadiene rubber (SBR), a chloroprene rubber (CR), a butyl rubber (IIR), and an acrylonitrile-butadiene rubber (NBR); and a non-diene based rubber such as an ethylene-propylene rubber (EPM), an ethylene-propylene-diene rubber (EPDM), a urethane rubber, a silicone rubber, an acrylic rubber, an epichlorohydrin rubber, a polysulfide rubber, a fluorine rubber, and a chlorosulfonated polyethylene rubber. The synthetic rubber may be used solely, or two of them may be used in combination.

The Mooney viscosity ($ML_{1+4}$ (100° C.)) of the synthetic rubber is preferably 40 or more, more preferably 42 or more, and even more preferably 45 or more, and is preferably 70 or less, more preferably 65 or less, and even more preferably 60 or less. If the Mooney viscosity of the synthetic rubber falls within the above range, the processability when performing molding is better.

It is noted that the Mooney viscosity ($ML_{1+4}$ (100° C.)) in the present disclosure is a value measured according to JIS K6300 using an L rotor under the conditions of preheating time: 1 minute, rotor rotation time: 4 minutes, and temperature: 100° C.

From the viewpoint of easily obtaining suitable viscosity, two synthetic rubbers having different Mooney viscosities are preferably used together. In this case, the Mooney viscosity difference between the synthetic rubbers is preferably 0 or more, more preferably 5 or more, and even more preferably 8 or more, and is preferably 30 or less, more preferably 20 or less, and even more preferably 15 or less.

In the present disclosure, as the synthetic rubber, particularly preferred is a high-cis polybutadiene rubber having a cis-1,4 bond in an amount of 40 mass % or more, preferably 80 mass % or more, and more preferably 90 mass % or more in view of their superior resilience.

The high-cis polybutadiene rubber preferably has a 1,2-vinyl bond in an amount of 2 mass % or less, more preferably 1.7 mass % or less, and even more preferably 1.5 mass % or less. If the amount of the 1,2-vinyl bond is 2 mass % or less, the resilience is better.

The high-cis polybutadiene rubber is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The high-cis polybutadiene rubber preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene rubber is 2.0 or more, the processability is better, and if the molecular weight distribution (Mw/Mn) of the high-cis polybutadiene rubber is 6.0 or less, the resilience is higher. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

(b) The co-crosslinking agent has an action of crosslinking a molecule of the synthetic rubber by graft polymerization to a molecular chain of (a) the rubber component. (b) The co-crosslinking agent is preferably an α,β-unsaturated carboxylic acid having 3 to 8 carbon atoms and/or a metal salt thereof.

Examples of the α,β-unsaturated carboxylic acid having 3 to 8 carbon atoms include acrylic acid, methacrylic acid, fumaric acid, maleic acid, and crotonic acid. Among them, methacrylic acid is particularly preferably used.

Examples of the metal component constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ion such as tin, and zirconium. The metal component may be used solely, or at least two of them may be used in combination. Among them, as the metal component, the divalent metal such as magnesium, calcium, zinc, barium, and cadmium is preferable, and zinc is more preferable. This is because use of the divalent metal salt of the α,β-unsaturated carboxylic acid having 3 to 8 carbon atoms easily generates a metal crosslinking between the rubber molecules. It is noted that the α,β-unsaturated carboxylic acid having 3 to 8 carbon atoms and/or the metal salt thereof may be used solely, or at least two of them may be used in combination.

The amount of (b) the co-crosslinking agent is preferably 20 parts by mass or more, more preferably 25 parts by mass or more, and even more preferably 30 parts by mass or more, and is preferably 50 parts by mass or less, more preferably 45 parts by mass or less, and even more preferably 40 parts by mass or less, with respect to 100 parts by mass of (a) the rubber component. If the amount of (b) the co-crosslinking agent is 20 parts by mass or more, the formed constituent member has a suitable hardness, and thus the golf ball has better resilience. On the other hand, if the amount of (b) the co-crosslinking agent is 50 parts by mass or less, the formed constituent member is not excessively hard, and thus the golf ball has better shot feeling and durability.

(c) The crosslinking initiator is blended in order to crosslink (a) the rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di (t-butylperoxy)hexane, and di-t-butylperoxide. These organic peroxides may be used solely, or at least two of them may be used in combination. Among them, dicumyl peroxide is preferably used.

The amount of (c) the crosslinking initiator is preferably 1.0 part by mass or more, more preferably 1.2 parts by mass or more, and even more preferably 1.5 parts by mass or more, and is preferably 3.0 parts by mass or less, more preferably 2.5 parts by mass or less, and even more preferably 2.0 parts by mass or less, with respect to 100 parts by mass of (a) the rubber component. If the amount of (c) the crosslinking initiator falls within the above range, the formed constituent member has a suitable hardness.

(d) The organic sulfur compound is blended as a crosslinking aid or a vulcanization accelerator in the rubber composition. (d) The organic sulfur compound is not particularly limited, as long as it is an organic compound having a sulfur atom in the molecule, and examples thereof include an organic compound having a thiol group (—SH) or a polysulfide bond with 2 to 4 sulfur atoms (—S—S—, —S—S—S—, or —S—S—S—S—), and a metal salt thereof (e.g. —SM, —S-M-S— wherein M is a metal atom).

Examples of (d) the organic sulfur compound include a compound belonging to thiophenols, thionaphthols, polysulfides, thiazoles, thiurams, thiocarboxylic acids, dithiocarboxylic acids, sulfenamides, and dithiocarbamates.

Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, and pentaiodothiophenol; and their metal salts.

As the thiophenols, pentachlorothiophenol and/or a zinc salt thereof is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro- 1-thionaphthol, 1-cyano-2-thionaphthol, 2-cyano-1-thion-aphthol, 1-acetyl-2-thionaphthol, 2-acetyl-1-thionaphthol, and their metal salts.

Examples of the metal salt include a monovalent metal salt such as sodium, lithium, potassium, copper (I), and silver (I); and a divalent metal salt such as zinc, magnesium, calcium, strontium, barium, titanium (II), manganese (II), iron (II), cobalt (II), nickel (II), zirconium (II), and tin (II). The metal salt may be used solely, or two of them may be used in combination. Among them, the divalent metal salt is particularly preferable, and a zinc salt is more preferable from the viewpoint of the resilience.

The polysulfides are organic sulfur compounds having a polysulfide bond, and examples thereof include disulfides, trisulfides, and tetrasulfides. As the polysulfides, diphe-nylpolysulfides are preferable.

Examples of the diphenylpolysulfides include diphenyld-isulfide; diphenyldisulfides substituted with a halogen group, such as bis(4-fluorophenyl)disulfide, bis(2,5-difluo-rophenyl)disulfide, bis(2,6-difluorophenyl)disulfide, bis(2,4, 5-trifluorophenyl)disulfide, bis(2,4,5,6-tetrafluorophenyl) disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pen-tachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, and bis(pentaiodophenyl)disulfide; and diphenyldisulfides substituted with an alkyl group, such as bis(4-methylphenyl)disulfide, bis(2,4,5-trimethylphenyl) disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiazoles include 2-mercaptobenzothiaz-ole, sodium salt, zinc salt, copper salt or cyclohexylamine salt of 2-mercaptobenzothiazole, 2,2'-dibenzothiazolyldisul-fide, 2-(4-morpholinodithio) benzothiazole, 2-(2,4-dinitrop-henyl) mercaptobenzothiazole, and 2-(2,6-diethyl-4-mor-pholinothio) benzothiazole.

As the thiazoles, 2-mercaptobenzothiazole is particularly preferable.

Examples of the thiurams include thiuram monosulfides such as tetramethylthiuram monosulfide; thiuram disulfides such as tetramethylthiuram disulfide, tetraethylthiuram dis-ulfide, and tetrabutylthiuram disulfide; and thiuram tetrasul-fides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfena-mide, and N-t-butyl-2-benzothiazole sulfenamide. Examples of the dithiocarbamates include zinc dimethyldi-thiocarbamate, zinc diethyldithiocarbamate, zinc dibutyldi-thiocarbamate, zinc ethylphenyldithiocarbamate, zinc dibenzyldithiocarbamate, zinc N-pentamethylenedithiocar-bamate, sodium dimethyldithiocarbamate, sodium diethyl-dithiocarbamate, sodium dibutyldithiocarbamate, copper (II) dimethyldithiocarbamate, iron (III) dimethyldithiocar-bamate, selenium diethyldithiocarbamate, and tellurium diethyldithiocarbamate.

(d) The organic sulfur compound may be used solely, or two of them may be used in combination.

The amount of (d) the organic sulfur compound is pref-erably 0.5 part by mass or more, more preferably 0.8 part by mass or more, and even more preferably 1.0 part by mass or more, and is preferably 15 parts by mass or less, more preferably 10 parts by mass or less, and even more prefer-ably 5 parts by mass or less, with respect to 100 parts by mass of (a) the rubber component. If the amount of (d) the organic sulfur compound falls within the above range, the golf ball has a suitable degree of the outer-hard and inner-soft structure.

In the present disclosure, from the viewpoint of a higher spin rate, as (d) the organic sulfur compound, (d1) the thiophenols and/or the polysulfides are preferably contained, (d1) the thiophenols and/or the polysulfides are more pref-erably used in combination with (d2) the thiazoles. In the case that (d1) the thiophenols and/or the polysulfides are used in combination with (d2) the thiazoles, their mass ratio ((d1) [thiophenols and/or polysulfides]/(d2) thiazoles) is preferably 0.2 or more, more preferably 0.3 or more, and even more preferably 0.4 or more, and is preferably 2.0 or less, more preferably 1.5 or less, and even more preferably 1.0 or less.

In the case that the rubber composition contains only the $\alpha,\beta$-unsaturated carboxylic acid having 3 to 8 carbon atoms as the co-crosslinking agent, the rubber composition may further contain (e) a metal compound. This is because neutralizing the $\alpha,\beta$-unsaturated carboxylic acid having 3 to 8 carbon atoms with the metal compound in the rubber composition provides substantially the same effect as using the metal salt of the $\alpha,\beta$-unsaturated carboxylic acid having 3 to 8 carbon atoms as the co-crosslinking agent. In addition, in case of using the $\alpha,\beta$-unsaturated carboxylic acid having 3 to 8 carbon atoms and the metal salt thereof in combination as the co-crosslinking agent, (e) the metal compound may also be used.

(e) The metal compound is not particularly limited, as long as (e) the metal compound can neutralize the $\alpha,\beta$-unsaturated carboxylic acid having 3 to 8 carbon atoms in the rubber composition. Examples of (e) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbon-ate, sodium carbonate, lithium carbonate, and potas-sium carbonate. (e) The metal compound may be used solely, or at least two of them may be used in combi-nation. (e) The metal compound is preferably the divalent metal compound, more preferably the zinc compound. This is because the divalent metal com-pound reacts with the $\alpha,\beta$-unsaturated carboxylic acid having 3 to 8 carbon atoms, thereby forming a metal crosslinking. Further, use of the zinc compound pro-vides a golf ball with higher resilience.

The rubber composition may further contain additives such as a pigment, a filler for adjusting a weight or the like, an antioxidant, a peptizing agent, or a softening agent, where necessary.

Examples of the pigment blended in the rubber compo-sition include a white pigment, a blue pigment, and a purple pigment. As the white pigment, titanium oxide is preferably used. The type of titanium oxide is not particularly limited, but rutile type is preferably used because of the high opacity.

In addition, the amount of titanium oxide is preferably 0.5 part by mass or more, more preferably 1 part by mass or more, and is preferably 8 parts by mass or less, more preferably 5 parts by mass or less, with respect to 100 parts by mass of (a) the rubber component.

Examples of the blue pigment include ultramarine blue, cobalt blue, and phthalocyanine blue. In addition, examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the rubber component. If the amount of the blue pigment is less than 0.001 part by mass, the blueness is not sufficient, and the color looks yellowish, and if the amount of the blue pigment is more than 0.2 part by mass, the color is excessively blue, and a vivid white appearance is not obtained.

The filler blended in the rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization aid and increases the hardness of the entire constituent member. The amount of the filler is preferably 0.5 part by mass or more, more preferably 5 parts by mass or more, even more preferably 10 parts by mass or more, and most preferably 15 parts by mass or more, and is preferably 35 parts by mass or less, more preferably 30 parts by mass or less, and even more preferably 28 parts by mass or less, with respect to 100 parts by mass of (a) the rubber component. If the amount of the filler is 0.5 part by mass or more, the weight adjusting becomes easier, and if the amount of the filler is 35 parts by mass or less, the weight proportion of the rubber component is not excessively small and thus lowering in the resilience is suppressed. It is noted that when the filler is a metal compound (e.g. a metal oxide, a metal carbonate), the filler also functions as (e) the metal compound described above.

The amount of the antioxidant is preferably 0.1 part by mass or more and 1 part by mass or less with respect to 100 parts by mass of (a) the rubber component. In addition, the amount of the peptizing agent is preferably 0.1 part by mass or more and 5 parts by mass or less with respect to 100 parts by mass of (a) the rubber component.

The rubber composition can be obtained by kneading (a) the rubber component, (b) the co-crosslinking agent, (c) the crosslinking initiator, (d) the organic sulfur compound, and the other optional components. The kneading method is not particularly limited, for example, a conventional kneading machine such as a kneading roll, a Banbury mixer, and a kneader can be used in the kneading method.

The spherical constituent member can be obtained by molding the kneaded rubber composition in a mold. The temperature for molding the spherical constituent member is preferably 120° C. or more, more preferably 150° C. or more, and even more preferably 160° C. or more, and is preferably 170° C. or less. In addition, the pressure for molding the spherical constituent member preferably ranges from 2.9 MPa to 11.8 MPa. The molding time preferably ranges from 10 minutes to 60 minutes.

The construction of the golf ball according to the present disclosure is not particularly limited, as long as the golf ball has the spherical constituent member. Examples of the golf ball according to the present disclosure include a one-piece golf ball having the spherical constituent member as a golf ball body, and a golf ball having the spherical constituent member as a spherical core. Examples of the golf ball having the spherical constituent member as the spherical core include a two-piece golf ball having a spherical core, and a single layered cover disposed around the spherical core; and a multi-piece golf ball (including a three-piece golf ball) having a spherical core, and a cover of at least two layers disposed around the spherical core. It is noted that the spherical core may be single-layered or multiple-layered, and is preferably single-layered. The present disclosure can be suitably applied to any one of the above golf balls. The golf ball according to the present disclosure is preferably the one-piece golf ball.

In the case that the golf ball according to the present disclosure has the spherical constituent member as the spherical core, the diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has a diameter in the range from 34.8 mm to 42.2 mm, the compression deformation amount of the spherical core (shrinking amount of the spherical core along the compression direction) when applying a load from an initial load of 98 N to a final load of 1275 N to the spherical core is preferably 2.5 mm or more, more preferably 2.6 mm or more, and even more preferably 2.7 mm or more, and is preferably 4.0 mm or less, more preferably 3.5 mm or less, and even more preferably 3.2 mm or less. If the compression deformation amount is 2.5 mm or more, the shot feeling is better, and if the compression deformation amount is 4.0 mm or less, the resilience is better.

When the golf ball according to the present disclosure has the spherical constituent member as the spherical core, the golf ball has a cover of at least one layer disposed around the spherical core. The cover is preferably formed from a resin composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Tefabloc" available from Mitsubishi Chemical Corporation.

Examples of the ionomer resin include a product obtained by neutralizing at least a part of carboxyl groups in a binary copolymer composed of an olefin and an $\alpha,\beta$-unsaturated carboxylic acid having 3 to 8 carbon atoms with a metal ion; a product obtained by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include a methyl ester, an ethyl ester, a propyl ester, a n-butyl ester, an isobutyl ester of acrylic acid, methacrylic acid, fumaric acid and maleic acid, and an acrylic acid ester or a methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

Specific examples of the ionomer resin include those having a trade name of "Himilan (registered trademark) (e.g. Himilan 1555 (Na), Himilan 1557 (Zn), Himilan 1605 (Na), Himilan 1706 (Zn), Himilan 1707 (Na), Himilan AM3711 (Mg), and Himilan AM7329 (Zn); and a ternary copolymer ionomer resin includes Himilan 1856 (Na), Himilan 1855 (Zn) or the like)" available from Du Pont-Mitsui Polychemicals Co., Ltd.

Specific examples of the ionomer resin further include those having a trade name of "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); and a ternary copolymer ionomer resin includes Surlyn 8120 (Na), Surlyn 8320 (Na), Surlyn 9320 (Zn), Surlyn 6320 (Mg), HPF 1000 (Mg), HPF 2000 (Mg)) or the like" available from Du Pont de Nemours, Inc.

Specific examples of the ionomer resin also include those having a trade name of "Iotek (registered trademark) (e.g. Iotek 8000 (Na), Iotek 8030 (Na), Iotek 7010 (Zn), and Iotek 7030 (Zn); and a ternary copolymer ionomer resin includes Iotek 7510 (Zn), Iotek 7520 (Zn) or the like)" available from ExxonMobil Chemical Company.

It is noted that Na, Zn, Li, Mg or the like described in the parentheses after the trade name of the ionomer resin represents a metal type of their neutralizing metal. The ionomer resin may be used solely, or two or more of them may be used in combination.

The resin composition preferably contains the thermoplastic polyurethane elastomer or the ionomer resin as the resin component. The amount of the thermoplastic polyurethane elastomer or the ionomer resin in the resin component of the resin composition is preferably 50 mass % or more, more preferably 60 mass % or more, and even more preferably 70 mass % or more. The resin component of the resin composition consists of the thermoplastic polyurethane elastomer or the ionomer resin.

In addition to the resin component described above, the resin composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as these additives don't impair the function of the cover.

The amount of the white pigment (e.g. titanium oxide) is preferably 0.5 part or more, more preferably 1 part or more, and even more preferably 1.5 parts by mass, and is preferably 10 parts or less, more preferably 8 parts or less, and even more preferably 6 parts by mass or less, with respect to 100 parts by mass of the resin component constituting the cover. If the amount of the white pigment is 0.5 part by mass or more, it is possible to impart the opacity to the resultant cover. In addition, if the amount of the white pigment is 10 parts by mass or less, the durability of the resultant cover is better.

Examples of the method for molding the cover include a method which comprises molding the resin composition into a hollow shell, covering the core with a plurality of the hollow shells and performing compression molding (preferably a method which comprises molding the resin composition into a hollow half shell, covering the core with two of the half shells and performing compression molding); and a method which comprises injection molding the resin composition directly onto the core.

When molding the cover by the compression molding method, the molding of the half shell may be performed by either a compression molding method or an injection molding method, and the compression molding method is preferable. Compression molding the resin composition into the half shell may be carried out, for example, under a pressure of 1 MPa or more and 20 MPa or less at a temperature of −20° C. or more and +70° C. or less relative to the flow beginning temperature of the resin composition. If the molding is carried out under the above conditions, the half shell having a uniform thickness can be formed. Examples of the method for molding the cover by using the half shell include a method of covering the core with two of the half shells, and compression molding the core with two of the half shells. Compression molding the half shells into the cover may be carried out, for example, under a pressure of 0.5 MPa or more and 25 MPa or less at a temperature of −20° C. or more and +70° C. or less relative to the flow beginning temperature of the resin composition. If the molding is carried out under the above conditions, the cover having a uniform thickness can be formed.

When injection molding the resin composition into the cover, the resin composition in the form of pellets obtained by extrusion may be used for the injection molding, or alternatively the cover materials of the base resin component, pigment or the like may be dry-blended and directly used for the injection molding. As the upper and lower molds for molding the cover, upper and lower molds having a hemispherical cavity and a pimple a part of which also serves as a retractable hold pin are preferably used. When molding the cover by the injection molding method, the cover can be formed by protruding the hold pin to hold the core, and charging the resin composition, followed by cooling. For example, the molding can be conducted as follows. The resin composition heated to a temperature ranging from 200° C. to 250° C. was charged for 0.5 second to 5 seconds into a mold held under a pressure ranging from 9 MPa to 15 MPa, and cooled for 10 seconds to 60 seconds, and then the mold is opened to eject the golf ball.

The thickness of the cover is preferably 4.0 mm or less, more preferably 3.0 mm or less, and even more preferably 2.0 mm or less. If the thickness of the cover is 4.0 mm or less, the obtained golf ball has better resilience or shot feeling. The thickness of the cover is preferably 0.3 mm or more, more preferably 0.4 mm or more, and even more preferably 0.5 mm or more. If the thickness of the cover is 0.3 mm or more, the impact durability or wear resistance of the cover is enhanced. In the case that the golf ball comprises a plurality of cover layers, the total thickness of a plurality of cover layers preferably falls within the above range.

The molded golf ball body (the one-piece golf ball body, or the golf ball body having the cover formed thereon) is ejected from the mold, and is preferably subjected to surface treatments such as deburring, cleaning and sandblast where necessary. In addition, if desired, a paint film or a mark may be formed.

Concave portions called "dimple" are usually formed on the surface of the golf ball according to the present disclosure. The total number of the dimples formed on the surface of the golf ball body is preferably 200 or more and 500 or less. If the total number of the dimples falls within the above range, the size of the dimples is suitable, and thus the dimple effect is easily obtained. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the paint film formed on the surface of the golf ball according to the present disclosure is not particularly limited, and is preferably 5 μm or more, more preferably 6 μm or more, and even more preferably 7 μm or more, and is preferably 50 μm or less, more preferably 40 μm or less, and even more preferably 30 μm or less. If the thickness of the paint film is 5 μm or more, the paint film is hard to wear off due to the continued use of the golf ball, and if the thickness of the paint film is 50 μm or less, the dimple effect is sufficiently obtained and thus the flight performance of the golf ball is enhanced. The resin for forming the paint film is not particularly limited, and examples thereof include a polyurethane, an epoxy resin, an acrylic resin, a vinyl acetate resin, and a polyester.

The golf ball according to the present disclosure preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present disclosure preferably has a mass of 40 g or more and 50 g or less. In light of obtaining greater inertia, the mass is preferably 44 g or more, particularly preferably 45.00 g or more. In light of satisfying a regulation of USGA, the mass is particularly preferably 45.93 g or less.

When the golf ball according to the present disclosure has a diameter in the range from 40 mm to 45 mm, the compression deformation amount of the golf ball (shrinking amount of the golf ball along the compression direction) when applying a load from 98 N as an initial load to 1275 N as a final load to the golf ball is preferably 2.5 mm or more, more preferably 2.6 mm or more, and even more preferably 2.7 mm or more, and is preferably 4.0 mm or less, more preferably 3.5 mm or less, and even more preferably 3.2 mm or less. If the compression deformation amount is 2.5 mm or more, the golf ball is not excessively hard and thus has better shot feeling. On the other hand, if the compression deformation amount is 4.0 mm or less, the resilience is higher.

Figure 2:
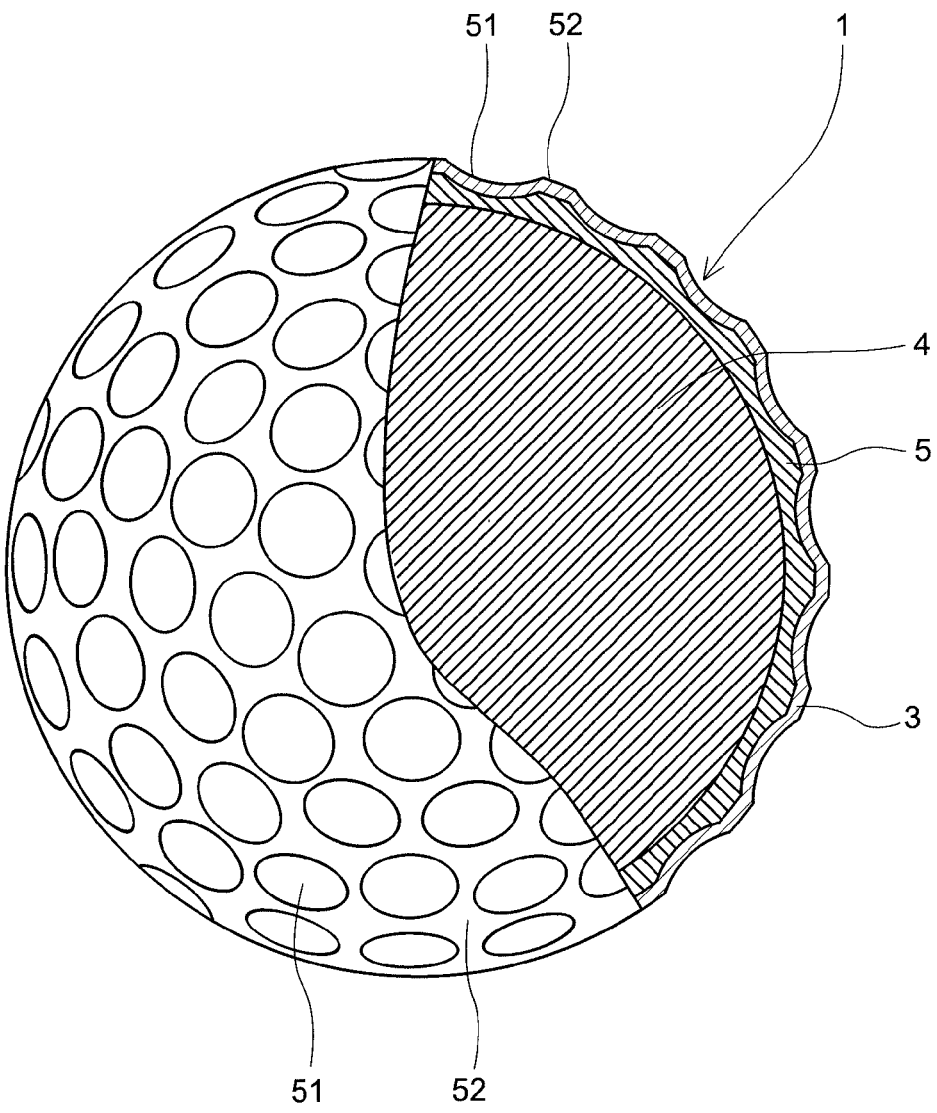
FIG. 2 is a partially cutaway cross-sectional view showing a multi-piece golf ball according to one embodiment of the present disclosure.

One example of the golf ball according to the present disclosure will be explained with reference to FIGS. 1, 2. FIG. 1 is a partially cutaway cross-sectional view showing a one-piece golf ball according to one embodiment of the present disclosure. FIG. 2 is a partially cutaway cross-sectional view showing a multi-piece golf ball according to one embodiment of the present disclosure.

The golf ball 1 of FIG. 1 is a one-piece golf ball composed of a golf ball body 2 consisting of the spherical constituent member, and a paint film 3 covering the golf ball body 2. A plurality of dimples 21 are formed on the surface of the golf ball body 2. Other portions than the dimples 21 on the surface of the golf ball 1 are lands 22. The golf ball 1 has the paint film 3 formed on an outer side of the golf ball body 2.

The golf ball 1 of FIG. 2 has a golf ball body composed of a spherical core 4 consisting of the spherical constituent member, and a cover 5 covering the spherical core 4. A plurality of dimples 51 are formed on the surface of the cover 5. Other portions than the dimples 51 on the surface of the golf ball 1 are lands 52. The golf ball 1 has a paint film 3 formed on an outer side of the cover 5.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Method]
(1) Hardness Distribution (Shore C Hardness)

A type P1 auto loading durometer available from Kobunshi Keiki Co., Ltd. provided with a Shore C type spring hardness tester was used to measure the hardness of the spherical constituent member. The Shore C hardness measured at the surface portion of the spherical constituent member was adopted as the surface hardness of the spherical constituent member. In addition, the spherical constituent member was cut into two hemispheres to obtain a cut plane, and the hardness at the central point of the cut plane and the hardness at predetermined distances from the central point of the cut plane were measured. It is noted that the hardness at each point other than the surface hardness and the center hardness was measured at four points at the predetermined distance from the central point of the cut plane, and the average value thereof was calculated.

(2) Compression Deformation Amount (Mm)

The compression deformation amount was measured with a YAMADA type compression tester "SCH". The golf ball was placed on a metal rigid plate of the tester. A metal cylinder slowly fell toward the golf ball. The golf ball sandwiched between the bottom of the cylinder and the rigid plate deformed. The travelling distance of the cylinder was measured when applying a load from an initial load of 98 N to a final load of 1275 N to the golf ball. The compression deformation amount (mm) was the travelling distance. The travelling speed of the cylinder before applying the initial load was 0.83 mm/s. The travelling speed of the cylinder when applying the load from the initial load to the final load was 1.67 mm/s.

(3) Coefficient of Resilience

A metal cylindrical object having a mass of 198.4 g was allowed to collide with each golf ball at a speed of 40 m/s, and the speeds of the cylindrical object and the golf ball before and after the collision were measured. The coefficient of resilience of each golf ball was calculated based on the respective speeds and mass of the golf ball and the cylindrical object. The measurement was conducted using twelve samples for each golf ball, and the average value thereof was adopted as the coefficient of resilience of the golf ball.

(4) Durability

A Wood #1 club (driver) with a metal head was installed on a swing robot available from True Temper Sports, Inc. The head speed was set at 45 m/s, and each golf ball was hit to collide with a collision plate. The hitting of the golf ball to collide with the collision plate is repeated until the golf ball was broken, and the hitting times were measured. The durability of each golf ball is shown as a comparison result to the hitting times calculated using the Golf balls No. 1 to 3 as a standard. Specifically, the compression deformation amount and hitting times of the Golf balls No. 1 to 3 were plotted to obtain a formula of a linear approximate curve of the compression deformation amount versus the hitting times, and the hitting times of the Golf balls No. 4 to 11 corresponding to the compression deformation amount thereof was calculated based on the formula. The durability of the Golf balls No. 4 to 11 was evaluated based on a difference between the measured hitting times and the calculated hitting times (measured hitting times-calculated hitting times).

Evaluation Standard

E: (measured hitting times-calculated hitting times) is at least 20.

G: (measured hitting times-calculated hitting times) is at least 10 and less than 20.

(5) Spin Rate on Driver Shots (Rpm)

A W #1 driver with a metal head (XXIO S, loft angel: 11°, available from Sumitomo Rubber Industries, Ltd.) was installed on a swing robot M/C available from Golf Laboratories, Inc. The golf ball was hit at a head speed of 40 m/s and 50 m/s, respectively, and the spin rate right after hitting the golf ball was measured. The measurement was conducted twelve times for each golf ball, and the average value thereof was adopted as the measurement value for that golf ball. The spin rate of the golf ball immediately after the hitting was measured by continuously taking a sequence of photographs of the hit golf ball. The spin rate of each golf ball is shown as a difference from the spin rate calculated using the Golf balls No. 1 to 3 as a standard. Specifically, the compression deformation amount and spin rate of the Golf balls No. 1 to 3 were plotted to obtain a formula of a linear approximate curve of the compression deformation amount versus the spin rate, and the spin rate of each of the Golf balls No. 4 to 11 corresponding to the compression deformation amount thereof was calculated based on the formula. A difference between the measured spin rate and the calculated spin rate (measured spin rate-calculated spin rate) is shown as the spin rate of the Golf balls No. 4 to 11 in Table 1.

[Production of Golf Ball]

According to the formulation shown in Table 1, the rubber compositions were kneaded with a kneading roll, and heat-pressed at a temperature of 170° C. for 20 minutes in upper and lower molds, each having a hemispherical cavity, to obtain golf ball bodies having a diameter of 42.77 mm (1.684 inches). The surface of the golf ball bodies obtained above was treated with sandblast and marked. Then a clear paint was applied, and dried in an oven at a temperature of 40° C. to obtain one-piece golf balls having a diameter of 42.77 mm (1.684 inches) and a mass of 45.4 g. Evaluation results for the obtained one-piece golf balls are shown in Table 1.

TABLE 1

| | | | Golf ball No. | 1 | 2 | 3 | 4 |
|---|---|---|---|---|---|---|---|
| Rubber composition (parts by mass) | (a) Rubber component | Synthetic rubber | BR730 | 33 | 33 | 33 | 22.5 |
| | | | BR01 | 55 | 55 | 55 | 37.5 |
| | | | IR2200 | 12 | 12 | 12 | — |
| | | Natural rubber | CV60 | — | — | — | 40 |
| | (b) Co-crosslinking agent | | Methacrylic acid | 22 | 22 | 22 | 22 |
| | (c) Crosslinking initiator | | DCP | 0.5 | 0.7 | 0.9 | 1.5 |
| | (d) Organic sulfur compound | | PCTP-Zn | — | — | — | 0.3 |
| | | | MBT | — | — | — | 1 |
| | Other component | | Zinc oxide | 23.4 | 23.4 | 23.4 | 23.4 |
| | | | Calcium carbonate | 2 | 2 | 2 | 2 |
| | | | Titanium oxide | 1 | 1 | 1 | 1 |
| Hardness distribution of golf ball (Shore C hardness) | | | Center hardness (Ho) | 65.2 | 62.6 | 62.4 | 63.0 |
| | | | Hardness at 12.5% point of radius (H12.5) | 65.9 | 63.5 | 64.0 | 63.7 |
| | | | Hardness at 25% point of radius (H25) | 68.0 | 66.6 | 66.7 | 65.3 |
| | | | Hardness at 37.5% point of radius (H37.5) | 69.5 | 69.3 | 69.7 | 67.4 |
| | | | Hardness at 50% point of radius (H50) | 71.0 | 72.5 | 73.9 | 69.2 |
| | | | Hardness at 62.5% point of radius (H62.5) | 72.0 | 74.7 | 77.3 | 70.1 |
| | | | Hardness at 75% point of radius (H75) | 71.9 | 76.1 | 78.9 | 69.8 |
| | | | Surface hardness (Hs) | 71.2 | 78.0 | 80.3 | 71.0 |
| | | | Hardness difference (Hs − Ho) | 6.0 | 15.4 | 18.0 | 8.1 |
| | | | Hardness difference (Hs − H50) | 0.2 | 5.5 | 6.4 | 1.9 |
| Evaluation of golf ball | | | Compression deformation amount (mm) | 3.1 | 2.7 | 2.5 | 3.8 |
| | | | Coefficient of resilience | 0.697 | 0.721 | 0.729 | 0.697 |
| | | | Durability | | Standard | | G |
| | | | Spin rate (W#1 40 m/s) | | Standard | | −308 |
| | | | Spin rate (W#1 50 m/s) | | Standard | | −261 |

| | | | Golf ball No. | 5 | 6 | 7 | 8 |
|---|---|---|---|---|---|---|---|
| Rubber composition (parts by mass) | (a) Rubber component | Synthetic rubber | BR730 | 22.5 | 22.5 | 22.5 | 22.5 |
| | | | BR01 | 37.5 | 37.5 | 37.5 | 37.5 |
| | | | IR2200 | — | — | — | — |
| | | Natural rubber | CV60 | 40 | 40 | 40 | 40 |
| | (b) Co-crosslinking agent | | Methacrylic acid | 22 | 22 | 24 | 24 |
| | (c) Crosslinking initiator | | DCP | 1.7 | 1.9 | 1.7 | 1.9 |
| | (d) Organic sulfur compound | | PCTP-Zn | 0.3 | 0.3 | 0.3 | 0.3 |
| | | | MBT | 1 | 1 | 1 | 1 |
| | Other component | | Zinc oxide | 23.4 | 23.4 | 23.4 | 23.4 |
| | | | Calcium carbonate | 2 | 2 | 2 | 2 |
| | | | Titanium oxide | 1 | 1 | 1 | 1 |

TABLE 1-continued

| | | | | | | |
|---|---|---|---|---|---|---|
| Hardness distribution of golf ball | | Center hardness (Ho) | 62.3 | 61.7 | 64.5 | 64.2 |
| (Shore C hardness) | | Hardness at 12.5% point of radius (H12.5) | 63.2 | 62.9 | 65.0 | 64.7 |
| | | Hardness at 25% point of radius (H25) | 65.6 | 65.2 | 66.8 | 66.4 |
| | | Hardness at 37.5% point of radius (H37.5) | 67.8 | 68.3 | 69.1 | 68.7 |
| | | Hardness at 50% point of radius (H50) | 70.5 | 71.1 | 72.1 | 72.1 |
| | | Hardness at 62.5% point of radius (H62.5) | 72.1 | 73.5 | 74.5 | 75.3 |
| | | Hardness at 75% point of radius (H75) | 72.4 | 74.3 | 75.7 | 77.3 |
| | | Surface hardness (Hs) | 73.5 | 76.3 | 76.9 | 79.3 |
| | | Hardness difference (Hs − Ho) | 11.2 | 14.6 | 12.4 | 15.1 |
| | | Hardness difference (Hs − H50) | 3.0 | 5.2 | 4.8 | 7.2 |
| Evaluation of golf ball | | Compression deformation amount (mm) | 3.5 | 3.2 | 3.0 | 2.7 |
| | | Coefficient of resilience | 0.704 | 0.711 | 0.710 | 0.715 |
| | | Durability | G | G | G | G |
| | | Spin rate (W#1 40 m/s) | −236 | −213 | −140 | −115 |
| | | Spin rate (W#1 50 m/s) | −215 | −167 | −106 | −71 |

| | | | | Golf ball No. | 9 | 10 | 11 |
|---|---|---|---|---|---|---|---|
| Rubber composition (parts by mass) | (a) Rubber component | Synthetic rubber | BR730 | | 22.5 | 22.5 | 22.5 |
| | | | BR01 | | 37.5 | 37.5 | 37.5 |
| | | | IR2200 | | — | — | — |
| | | Natural rubber | CV60 | | 40 | 40 | 40 |
| | (b) Co-crosslinking agent | | Methacrylic acid | | 26 | 26 | 26 |
| | (c) Crosslinking initiator | | DCP | | 1.5 | 1.7 | 1.9 |
| | (d) Organic sulfur compound | | PCTP-Zn | | 0.75 | 0.75 | 0.75 |
| | | | MBT | | 1 | 1 | 1 |
| | Other component | | Zinc oxide | | 23.4 | 23.4 | 23.4 |
| | | | Calcium carbonate | | 2 | 2 | 2 |
| | | | Titanium oxide | | 1 | 1 | 1 |
| Hardness distribution of golf ball | | | Center hardness (Ho) | | 70.0 | 70.1 | 69.7 |
| (Shore C hardness) | | | Hardness at 12.5% point of radius (H12.5) | | 70.4 | 70.6 | 70.8 |
| | | | Hardness at 25% point of radius (H25) | | 72.4 | 72.6 | 72.9 |
| | | | Hardness at 37.5% point of radius (H37.5) | | 74.0 | 74.6 | 75. |
| | | | Hardness at 50% point of radius (H50) | | 74.8 | 76.2 | 77.4 |
| | | | Hardness at 62.5% point of radius (H62.5) | | 75.1 | 76.9 | 78.8 |
| | | | Hardness at 75% point of radius (H75) | | 73.9 | 76.6 | 78.8 |
| | | | Surface hardness (Hs) | | 73.0 | 76.5 | 78.6 |
| | | | Hardness difference (Hs − Ho) | | 3.0 | 6.4 | 8.9 |
| | | | Hardness difference (Hs − H50) | | −1.8 | 0.2 | 1.2 |
| Evaluation of golf ball | | | Compression deformation amount (mm) | | 3.0 | 2.7 | 2.5 |
| | | | Coefficient of resilience | | 0.700 | 0.712 | 0.718 |
| | | | Durability | | E | E | E |
| | | | Spin rate (W#1 40 m/s) | | 18 | 60 | 47 |
| | | | Spin rate (W#1 50 m/s) | | 65 | 86 | 121 |

BR730: high-cis butadiene rubber (amount of cis-1,4 bond = 96 mass %, Moony viscosity ($ML_{1+4}$ (100° C.) = 55) available from JSR Corporation
BR01: high-cis butadiene rubber (amount of cis-1,4 bond = 95 mass %, Moony viscosity ($ML_{1+4}$ (100° C.) = 45) available from JSR Corporation
IR2200: isoprene rubber (Moony viscosity ($ML_{1+4}$ (100° C.) = 82) available from Zeon Corporation
CV60: natural rubber (Moony viscosity ($ML_{1+4}$ (100° C.) = 60)
Methacrylic acid: available from Mitsubishi Chemical Corporation
DCP: "Percumyl (registered trademark) D" (dicumyl peroxide) available from NOF Corporation
PCTP-Zn: zinc pentachlorothiophenol (containing 28 mass % to 32 mass % of zinc stearate) available from FUJIFILM Wako Chemicals Corporation
MBT: "Nocceler M-P" (2-mercaptobenzothiazole) available from Ouchi Shinko Chemical Industrial Co., Ltd.
Zinc oxide: "Ginrei R" available from Toho Zinc Co., Ltd.
Calcium carbonate: "Whiton BF-300" available from Shiraishi Calcium Kaisha Ltd.
Titanium oxide: "CR-60" available from Ishihara Sangyo Kaisha, Ltd.

It is apparent from the results of Table 1 that each of the golf balls according to the present disclosure that comprise a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is less than 16 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness, has a high spin rate on driver shots while having improved durability.

The golf ball according to the present disclosure travels a restricted flight distance due to the high spin rate, and thus is also suitably used in a narrow practice range. In addition, the golf ball according to the present disclosure has improved durability.

The preferable embodiment 1 according to the present disclosure is a golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is less than 16 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness.

The preferable embodiment 2 of the present disclosure is the golf ball according to the embodiment 1, wherein the hardness difference (Hs–Ho) is 10 or less in Shore C hardness.

The preferable embodiment 3 of the present disclosure is the golf ball according to the embodiment 1 or 2, wherein the absolute value of the hardness difference (Hs–H50) is 5 or less in Shore C hardness.

The preferable embodiment 4 of the present disclosure is the golf ball according to any one of the embodiments 1 to 3, wherein the hardness (H50) at the 50% point of the radius of the spherical constituent member from the center of the spherical constituent member is 73 or more in Shore C hardness.

The preferable embodiment 5 of the present disclosure is the golf ball according to any one of the embodiments 1 to 4, wherein the golf ball has a diameter ranging from 40 mm to 45 mm, and a compression deformation amount of 2.5 mm or more and 4.0 mm or less when applying a load from an initial load of 98 N to a final load of 1275 N to the golf ball.

The preferable embodiment 6 of the present disclosure is the golf ball according to any one of the embodiments 1 to 5, wherein (a) the rubber component contains the natural rubber in an amount ranging from 10 mass % to 50 mass %.

The preferable embodiment 7 of the present disclosure is the golf ball according to any one of the embodiments 1 to 6, wherein the rubber composition contains (d1) an organic sulfur compound of thiophenols and/or polysulfides.

The preferable embodiment 8 of the present disclosure is the golf ball according to the embodiment 7, wherein the rubber composition further contains (d2) an organic sulfur compound of thiazoles.

The preferable embodiment 9 of the present disclosure is the golf ball according to any one of the embodiments 1 to 8, wherein the golf ball is a one-piece golf ball composed of the spherical constituent member.

This application is based on Japanese Patent application No. 2023-022444 filed on Feb. 16, 2023, the content of which is hereby incorporated by reference.

The invention claimed is:

1. A golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is 12 or less in Shore C hardness, an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness, and a hardness difference (H50–Ho) between the hardness (H50) and the hardness (Ho) ranges from 3 to 10 in Shore C hardness.

2. The golf ball according to claim 1, wherein the hardness difference (Hs–Ho) is 10 or less in Shore C hardness.

3. The golf ball according to claim 1, wherein the absolute value of the hardness difference (Hs–H50) is 5 or less in Shore C hardness.

4. The golf ball according to claim 1, wherein the hardness (H50) at the 50% point of the radius of the spherical constituent member from the center of the spherical constituent member is 73 or more in Shore C hardness.

5. The golf ball according to claim 1, wherein the golf ball has a diameter ranging from 40 mm to 45 mm, and a compression deformation amount of 2.5 mm or more and 4.0 mm or less when applying a load from an initial load of 98 N to a final load of 1275 N to the golf ball.

6. The golf ball according to claim 1, wherein (a) the rubber component contains the natural rubber in an amount ranging from 10 mass % to 50 mass %.

7. The golf ball according to claim 1, wherein the rubber composition contains (d1) an organic sulfur compound of thiophenols and/or polysulfides.

8. The golf ball according to claim 7, wherein the rubber composition further contains (d2) an organic sulfur compound of thiazoles.

9. The golf ball according to claim 1, wherein the golf ball is a one-piece golf ball composed of the spherical constituent member.

10. The golf ball according to claim 8, wherein a mass ratio ((d1)/(d2)) of (d1) the organic sulfur compound of thiophenols and/or polysulfides to (d2) the organic sulfur compound of thiazoles ranges from 0.2 to 2.0.

11. The golf ball according to claim 1, wherein the hardness difference (Hs–Ho) ranges from 3 to 12 in Shore C hardness.

12. The golf ball according to claim 1, wherein the hardness (Ho) ranges from 65 to 80 in Shore C hardness.

13. The golf ball according to claim 1, wherein the hardness (Hs) ranges from 70 to 90 in Shore C hardness.

14. The golf ball according to claim 1, wherein the hardness (H50) ranges from 73 to 80 in Shore C hardness.

15. The golf ball according to claim 1, wherein (a) the rubber component further contains a synthetic rubber.

16. The golf ball according to claim 15, wherein the synthetic rubber has a Mooney viscosity (ML$_{1+4}$ (100° C.)) ranging from 40 to 70.

17. A golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member is 3 or more and less than 16 in Shore C hardness, an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness, a hardness difference (H50–Ho) between the hardness (H50) and the hardness (Ho) ranges from 3 to 10 in Shore C hardness, and the hardness (H50) ranges from 76.2 to 85 in Shore C hardness.

18. A one-piece golf ball formed from a rubber composition, wherein the rubber composition contains (a) a rubber component containing a natural rubber and a synthetic rubber, (b) a co-crosslinking agent, (c) a crosslinking initiator, (d1) an organic sulfur compound of thiophenols and/or polysulfides and (d2) an organic sulfur compound of thiazoles, a center hardness (Ho) of the one-piece golf ball is 65 or more in Shore C hardness, a hardness difference (Hs–Ho) between a surface hardness (Hs) and the center hardness (Ho) of the one-piece golf ball is 12 or less in Shore C hardness, an absolute value of a hardness difference (Hs–H50) between the surface hardness (Hs) of the one-piece golf ball and a hardness (H50) at a 50% point of a radius of the one-piece golf ball from a center of the one-piece golf ball is 10 or less in Shore C hardness, and a hardness difference (H50–Ho) between the hardness (H50) and the hardness (Ho) ranges from 3 to 10 in Shore C hardness.

19. The one-piece golf ball according to claim 18, wherein (a) the rubber component contains the natural rubber in an amount ranging from 10 mass % to 50 mass %, and a mass ratio ((d1)/(d2)) of (d1) the organic sulfur compound of thiophenols and/or polysulfides to (d2) the organic sulfur compound of thiazoles ranges from 0.2 to 2.0.

20. A golf ball comprising a spherical constituent member, wherein the spherical constituent member is formed from a rubber composition containing (a) a rubber component containing a natural rubber, (b) a co-crosslinking agent, (c) a crosslinking initiator, and (d) an organic sulfur compound, a center hardness (Ho) of the spherical constituent member is 65 or more in Shore C hardness, a hardness difference (Hs–Ho) between a surface hardness (Hs) and the center hardness (Ho) of the spherical constituent member ranges from 5 to 12 in Shore C hardness, and an absolute value of a hardness difference (Hs–H50) between the surface hardness (Hs) of the spherical constituent member and a hardness (H50) at a 50% point of a radius of the spherical constituent member from a center of the spherical constituent member is 10 or less in Shore C hardness.

* * * * *